Sept. 21, 1965  C. H. VAN HARTESVELDT ETAL  3,207,062
CONTINUOUS MOLDING MACHINE
Original Filed Nov. 21, 1960  4 Sheets-Sheet 3
Fig-5
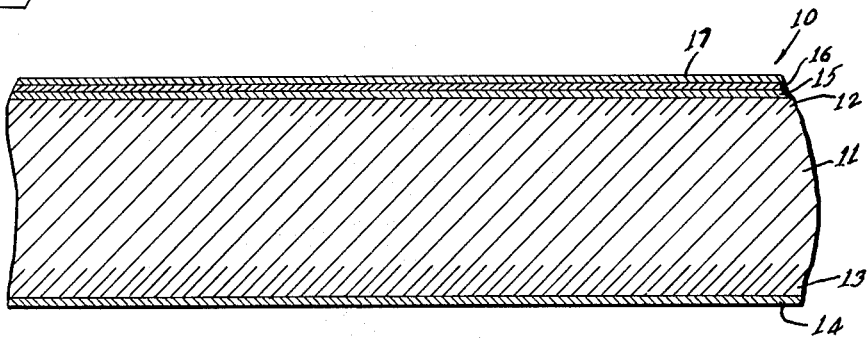
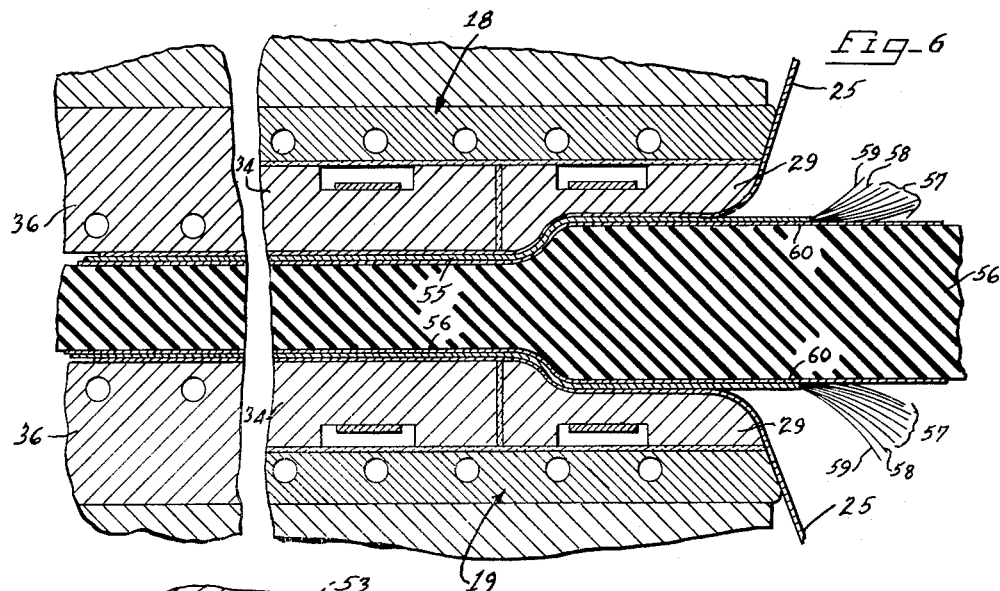
Fig-6
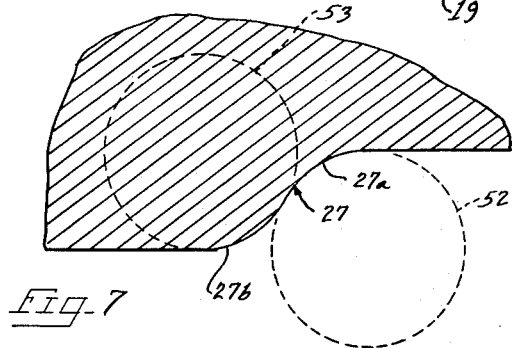
Fig-7
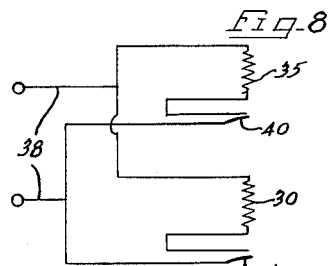
Fig-8
INVENTOR.
Carroll H. Van Hartesveldt
BY Buddy D. Wahl
Olsen and Stephenson
ATTORNEYS :::: {.columns}
::: {.column}
United States Patent Office 3,207,062
Patented Sept. 21, 1965

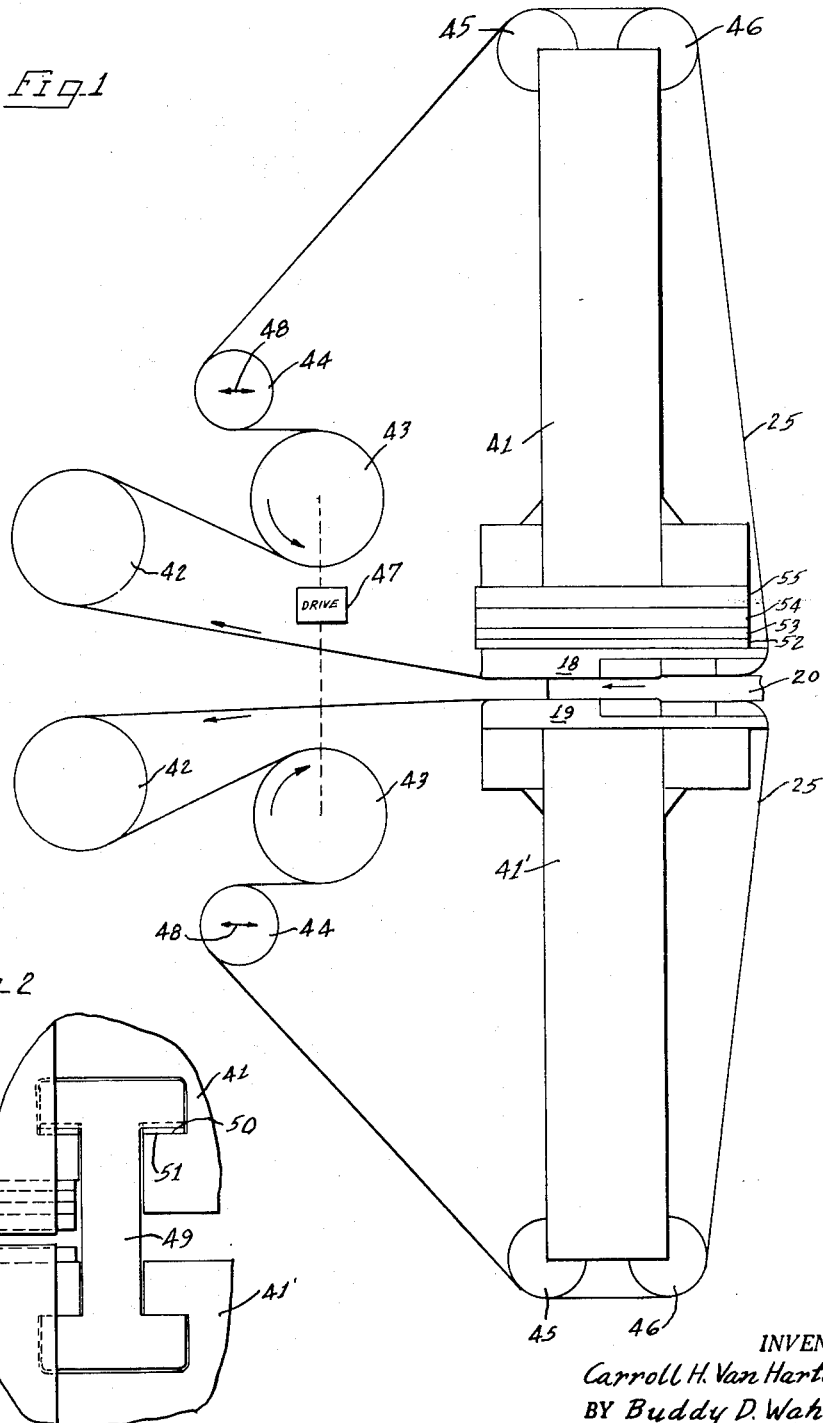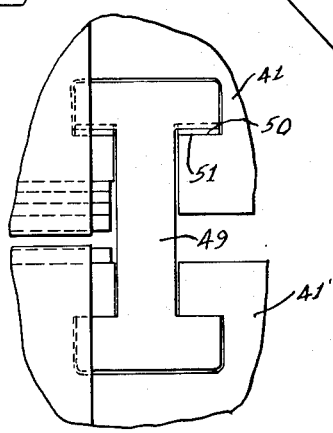

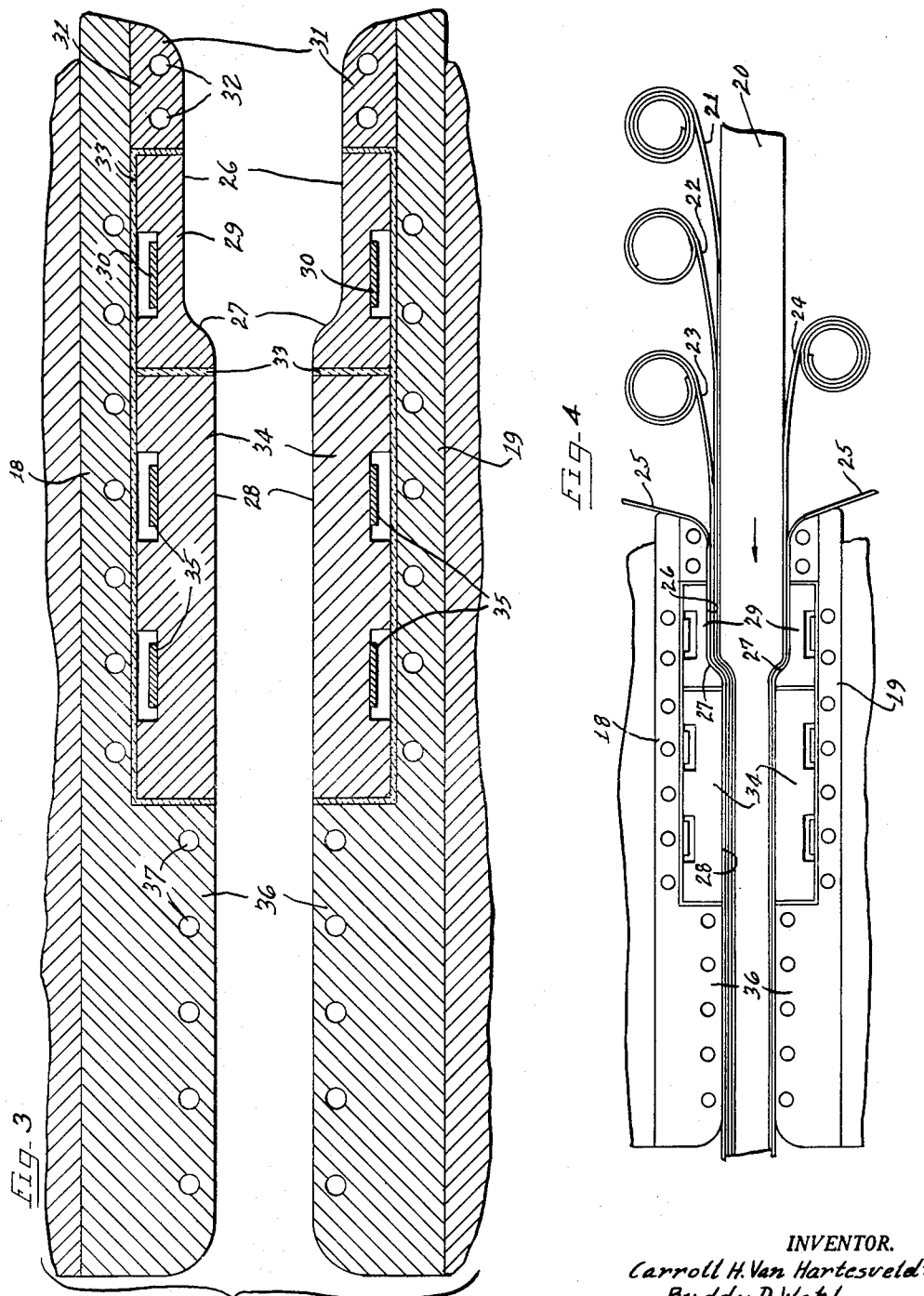

3,207,062
CONTINUOUS MOLDING MACHINE
Carroll H. Van Hartesveldt and Buddy D. Wahl, Toledo,
  Ohio, assignors to Hoover Ball and Bearing Company,
  Ann Arbor, Mich., a corporation of Michigan
Original application Nov. 21, 1960, Ser. No. 70,498, now
  Patent No. 3,159,526, dated Dec. 1, 1964. Divided
  and this application Sept. 14, 1962, Ser. No. 223,629
12 Claims. (Cl. 100—93)

The present invention relates to a mechanism for providing an improved wood product having a finished hardened surface. This application is a division of our prior application, Serial No. 70,498, filed November 21, 1960 now Patent No. 3,159,526.

This application also relates to the disclosure in our prior application, Serial No. 6,189, filed February 2, 1960, now Patent No. 3,171,167 and pending application, Serial No. 224,158, filed September 17, 1962, as a division of the aforesaid application, Serial No. 6,189.

Wood surfaces have heretofore been covered with sheets of high pressure plastic laminates for protecting the wood and providing an attractive smooth moisture resistant and heat resistant surface. The plastic laminate sheets are usually cemented to sheets of wood such as plywood or compressed particle boards or shaving boards. The plastic laminated sheets are manufactured separately and usually include a large number of core sheets formed of phenolic resin impregnated core stock papers with a melamine resin impregnated pattern paper on the core stock papers and a melamine resin clear overlay on the pattern paper. A feature of the present invention is to provide a finished laminated board with a finished plastic laminate surface wherein the layers of plastic and the wood are joined in a single manufacturing operation and wherein all but one or two of the phenolic resin backing layers are eliminataed to effect a substantial saving in material. This is accomplished by the apparatus of the invention which creates a layer of compressed wood on the surface of a board supporting the finished layers of plastic laminate and supported by the softer core of the board. Another feature of the invention is the rapid curing of the thermosetting impregnants at rates heretofore considered unsuccessful, with the curing being accomplished simultaneously with the lamination of the plastic and wood.

An object of the invention is to provide an improved mechanism for forming laminated surface boards of a structure which effects the saving in eliminating layers of plastic laminates heretofore considered necessary and obtaining a finished product as good as or better than laminated surface boards produced by previous methods.

Another object of the invention is to provide a mechanism for producing a laminated surface board which is capable of joining melamine resin impregnated papers to types of wood products on which conventional methods do not work and in which variations in sub-surface hardness in the wood product do not adversely affect the plastic hard case surface on the wood.

Another object of the invention is the provision of mechanism for rapidly curing thermosetting resins for producing laminated resin sheets and surface boards with finished plastic surfaces.

Another object of the invention is to provide an im-
:::
::: {.column}
proved machine for producing surface boards capable of continuous and rapid operation.

A still further object of the invention is to provide a machine for making an improved finished surface board product with improved features of structure.

Other objects and advantages will become more apparent with the teaching of the principles of the invention in connection with the disclosure of the preferred embodiments thereof in the specification, claims and drawings, in which:

FIGURE 1 is a side elevational view shown somewhat in schematic form of a machine constructed in accordance with the principles of the present invention;

FIGURE 2 is a detailed fragmentary elevational view of a portion of the mechanism of FIGURE 1;

FIGURE 3 is an enlarged detailed sectional view taken through the shoes or mandrels for forming the product of the present invention;

FIGURE 4 is a side elevational view illustrating the steps in forming the product and feeding material to the machine;

FIGURE 5 is a fragmentary enlarged sectional view of a form of the product of the invention;

FIGURE 6 is a fragmentary side elevational view showing a modified form of the invention;

FIGURE 7 is a greatly enlarged fragmental sectional view taken through the shoe for compressing the material in the process of the invention;

FIGURE 8 is a diagrammatic view of a portion of an electrical circuit for operating the heaters for the shoes.

In the drawings:

Figure 9:
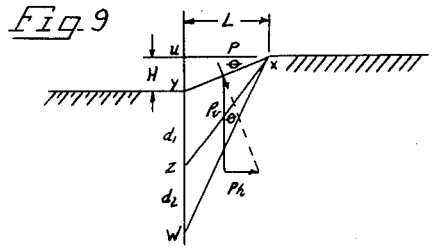
FIGURES 9 through 14 are diagrams showing features of structure and supplementing the mathematical analysis given in the following description.

FIGURE 5 shows a product which takes the form of a finished surface board having a core 11 of wood such as a board, or a sheet of plywood, or a pressed board formed of chips or wood fragments. The core 11 supports case hardened or compressed layers 12 and 13 of wood which are compressed to maximum density at their outer surfaces and when formed by the process of the invention will have a density decreasing substantially linearly inwardly toward the core 11. The hard outer surfaces of the layers 12 and 13 will have a specific gravity of 1.3 to 1.4 and the inner core 11 will have the natural density of the wood which of course will vary with the types of wood employed. The layer 13 may be slightly thicker than the layer 12 to balance the thickness of the total laminations carried on the core, including the plastic laminations, to prevent curling or warping of the board and to permit compression with shoes having steps of equal depth, as will later become clear with the description of the method and mechanism for making the product.

The lower surface layer 13 is covered by a plastic layer 14 provided by putting only one light resin impregnated thermosetting plastic sheet on the surface.

The top finished surface of the laminated surface board is covered with a heavier layer of laminated plastic formed by an inner layer 15, an intermediate layer 16, and an outer layer 17. In the finished product these layers are joined by pressure and heat and the thermosetting plastic is cured. The inner layer or sheet 15 is a phenolic resin impregnated sheet, the intermediate layer 16 is a mela-
:::
::::

mine resin pattern sheet, and the outer layer or sheet 17 is a substantially clear melamine resin (which is preferably alpha-cellulose sheet impregnated with about 50% B-stage melamine-formaldehyde condensate). In some circumstances the lower layer 15 can be omitted but the provision of this single layer 15 or of two layers of phenolic resin have been found to prevent the formation of tiny irregularities and an apparent resultant loss of gloss which occurs with adverse usage and certain test procedures. For example, a test procedure involves subjecting the surface to a temperature of 355° F. for 20 minutes. The provision of the additional lower sheet 15 of core stock phenolic resin paper under the melamine pattern paper prevents an apparent loss of gloss and flatness with this treatment.

In the method of forming the surface board, the layer impregnated with thermosetting resin is applied (e.g. as a conventional B-stage melamine-formaldehyde resin impregnant) and cured and the surface layer on the wood workpiece is compressed in a substantially simultaneous operation. The layers of thermosetting plastic impregnated sheets are placed on the surfaces of a wood workpiece and the plastic is heated rapidly to a highly viscous state, that is, to a temperature so that the resin in the papers will maintain integrity as they are compressed preventing liquid plastic from rupturing the paper. A local pressure is then applied to the outer surface of the plastic covered wood which exceeds the compressive strength of the wood. The local pressure is progressively moved along the wood workpiece so as to form a compressed layer beneath the plastic.

The plastic is then immediately continued to be heated to a relatively high curing temperature on the order of 365° F. for a short curing time and then immediately cooled. A heating time for the curing on the order of 25 seconds with the application of heat at 365° F., and a cooling time of 10 seconds has proved satisfactory (using paper sheets impregnated with 20% of conventional B-stage melamine-formaldehyde condensate). A cure of the melamine resin surface results in the length of time being substantially shorter than heretofore thought possible. Applicants believe that this rapid cure has been made possible because of the rapid heatup and cool down of the material cured. One manufacturer recommends a cure time of 18 to 21 minutes and suggests a curing temperature of 285° F. for one grade and 300° F. for another grade. Another manufacturer of melamine resins recommends a cure time of 20 to 30 minutes at 275° F. (135° C.) or 10 minutes at 302° F. (150° C.). This latter manufacturer also recommends that heating should be regulated to prevent the laminate from exceeding 143–150° C. Another manufacturer of melamine recommends that maximum temperature should not exceed 295° F. By the method of this invention, the plastic is heated in excess of these temperatures, and preferably on the order of 365° F.

Applicants' rapid cure process which is contrary to previous theories, is possible in applicants' preferred form of mechanism, and is not practical in large conventional presses used for high pressure melamine laminates. Applicants' use of an elevated temperature in the new process makes the chemical reaction rapid and is precisely timed for completion so that the time-temperature effect of warmup and cool down is minimized to insignificant proportions.

In the practice of the instant invention the thermosetting resin used, in each of the specific uses, may be any one or mixtures of the conventional commercially available thermosetting resins, which include the phenolic resins (i.e. phenol-formaldehyde condensation products) and the so-called "amine-formaldehyde" resins (the preferred members of this group being the melamine-formaldehyde condensation products). These resins are thermosetting, in the sense that they are set to their permanent infusible form by heat, during a process which, of course, involves initial fusion of the resinous material just prior to the setting, or curing process. For use in the lower layers or inner layers of sheeting or paper in the practice of the instant invention, the B-stage phenol-formaldehyde resins are preferred, because the use of these resins has certain economic advantages and they are found to be compatible with the preferred melamine resins which are used in the outer layers or the overlayers. In the practice of the invention, however, the amine-aldehyde resins may also be used. These resins are preferably formed by reaction of formaldehyde with a compound having a plurality of $NH_2$ groups in its molecule, each attached to a carbon atom which in turn is attached by a double bond to O, S or N. Thus in urea, the carbon is attached by a double bond to an oxygen atom. In thiourea the carbon is attached by a double bond to a sulfur atom; and in melamine, each carbon atom having an amine group attached thereto is in turn attached by a double bond to an intracyclic nitrogen atom. Preferred resins of the instant invention are formaldehyde condensates with polyamino triazines, such as melamine, benzoguanamine, ammeline, etc.

Although certain resins are preferred, the instant invention is not limited in use to any particular thermosetting resin. The thermosetting resins go through a cycle that is particularly adapted for use in the instant invention. For example, the thermosetting resins, initially available as condensation products, respond first to heat by liquefying into a fairly fluid state. As soon as the resin is liquefied, however, it starts to become increasingly viscous and ultimately is converted to the hard infusible state. All of this involves a very rapid cycle in conventional molding processes. In laminating processes, however, the cycle is much slower, because of difficulties in heating through the plies of the laminate and difficulties encountered by thermal damage to the plies. In the practice of the instant invention, however, an extremely rapid heating cycle is effected by the use of the particular heating means in conjunction with the extreme pressures to which the resins are subjected. This makes possible the use of higher curing temperatures without thermal damage to the plies and/or resin, because of the extremely short cycle. The invention involves conversion of the resin from its initial thermosetting or B-stage condition to the thermoset or infusible condition simultaneously with the compression step, and during the same overall period of time that the compression step is carried out. The temperature used to effect the curing or thermosetting of the resin is, of course, a temperature in the range from about 30 to about 100° F. above the conventional curing temperatures for laminating resins. It is, in fact, a temperature that is sufficient to effect curing of the resin under the conditions and within the time cycle provided for carrying out the compression step. The time cycle may range from a minimum of about 10 to 15 seconds to a practical maximum of about 1 minute. The resin curing temperatures for the preferred phenolic or polyamine-formaldehyde condensates may range from about 300 to 330° F. to as much as about 375° F. The concentration of resin impregnant in the individual sheets or layers may range from a practical minimum of about 5% (by weight) to a practical maximum of about 60%.

For the application of heat and pressure a pair of opposed shoes 18 and 19, FIGURES 3 and 4, are used. FIGURE 4 illustrates a wood workpiece 20 being moved between the mandrels or shoes 18 and 19 with a layer 21 of phenolic resin impregnated paper being impregnated on the upper surface of the wood workpiece, a layer 22 of pattern paper placed over the layer 21, and a layer of melamine resin impregnated paper 23 placed on top of the pattern paper. A layer of melamine resin impregnated paper 24 is placed beneath the lower surface of the wood workpiece 20. The wood workpiece with the superimposed layers of thermosetting plastic is suitably forced between the shoes 18 and 19 and as shown is frictionally carried between opposed traveling thin sheets or shims 25. These sheets are drawn over the working surfaces of the shoes to frictionally draw the wood workpiece with them. The sheets or shims are preferably a part of a machine for obtaining continuous movement as will be described in connection with FIGURES 1 and 2 wherein the shims are formed in endless belts powered by rolls.

The shoes 18 and 19 are provided with a first surface 26 which is heated and which is parallel to the path of travel of the wood workpiece 20, as indicated by the direction arrow on the workpiece. The workpiece and plastic layers then engage a sloping incline compression surface 27. The shoes then have a third surface 28 which holds the surfaces of the wood workpiece compressed and which also extends parallel to the direction of travel of the wood workpiece.

The first surface 26 is formed beneath preheat blocks 29 provided with a heating element 30. The preheat block, in a preferred form of the method, is heated to 365° F., but the temperature can be regulated independently as will be described in connection with FIGURE 8. The plastic layers are heated to a temperature where the plastic is in a highly viscous state and the function of the preheat blocks 29 is to bring the resin in the papers to sufficient cure under pressure so that they will maintain their integrity as they go by the compression step and not be taken so far into the cure that they will crack when going by. For example, if the heating block temperature is too low or if the work passes them too quickly the resin will be liquid as it passes the compression step. This causes hydraulic forces in the liquid to tear the paper. On the other hand, if the preheat blocks are too hot, or if the workpiece passes the preheat blocks too slowly, the resin in the paper can become embrittled before it flows into final place in the compressed overlaid papers. When this happens the surface has a cloudy appearance and cracks in extreme cases. The temperature of the plastic is of course dependent upon the heat of the preheat blocks and the speed at which the plastic travels past the blocks, and at proper temperature the impregnating resins are brought to a liquid of high viscosity before the compression step. The flow which then takes place is so limited that the carrier papers are not disrupted. For example, using a clear melamine impregnated overlaid paper on top of a melamine impregnated pattern paper placed over one half inch shavings board, preheat blocks six inches long at a temperature of 365° F. with a linear speed of five feet per minute has provided excellent results.

The pressure generated at the inclined surface 27 is a function of the compression step and the push back of the material. A resistance to the forward travel of the wood workpiece 20 is of course provided by the compression step which must be overcome by the force of the traveling shims 25.

To provide a sufficient lead in surface 26 for adequate frictional force on the workpiece, extensions 31 are mounted ahead of the preheat blocks 29. These extensions are not heated but are maintained cool such as by the provision of coolant passages 32. The extensions have a surface which is coplanar with the lower surface of the preheat blocks 29 and have a rounded lead-in nose portion over which the shims 25 travel. Insulation 33 is provided between the sections of the machine in order that the sections will retain their individual temperatures.

Directly after the compression surface 27 are located curing blocks 34 having heating elements 35. In a machine having preheat features as above discussed, the curing section was heated to 365° F. with the speed of travel of five feet per minute, a length of curing block 34 was chosen to give a total heating time of 25 seconds. The compression step for the surface 27 provided a surface compression of .050 inch. Cooling blocks 36 were chosen to afford a cooling time of 10 seconds. The cooling blocks 36 are provided with passages 37 for a coolant.

The cooling section of course can be longer and is of sufficient length to drop the temperature of the plastic down to substantially 80° F.

As illustrated in FIGURE 8, the heating elements 30 and 35 for the preheat blocks and the curing blocks respectively are connected to a supply line 38 to be operated independently. A control 39 is provided for the preheat element and a control 40 is provided for the curing heating elements. These controls, which are shown schematically, may be thermostatic controls for maintaining a uniform heat and may be provided with a manual selector whereby the heat maintained can be selectively changed.

As illustrated in FIGURES 1 and 2, the belt shims 25 are carried in upper and lower frames 41 and 41'. The belts are supported on rollers and each of the frames and rollers are substantially identical in construction. The belts successively pass around rollers 42, 43, 44, 45 and 46. The rollers 43 are driven by a suitable drive 47 and the rollers 44 are shiftable to provide tension in the belts as indicated by the arrowed lines 48. The space between the shoes 18 and 19 is controlled by selecting the desired size and number of removable blocks 52, 53, 54 and 55. The attachment member 49, FIGURE 2, is shown in the shape of an I. The ends of the I slide over surfaces 50 in the frames 41 and 41' and are provided with shim spacers 51 beneath the heads. It is necessary to remove attachment member 49 to install belt shims 25.

The thickness of the shim material used to draw the workpieces between the shoes is critical and the material must have a high tensile strength and is preferably of stainless steel. The material requirement is related to the shape of the surface 27 and must be sufficiently thin so that it is not cold worked by bending over the surface and must be sufficiently strong so that it will not exceed its yield point due to the force required to draw the workpiece through the shoes 18 and 19.

It has been found that an optimum shape for the step is formed by curved surfaces meeting each other with each curved surface forming the segment of an arc of a cylinder. As shown in FIGURE 7, the surface 27 is shown provided by a portion 27a which is a segment or an arc of cylinder 52 shown in dotted line form. The latter portion of the surface 27 is shown at 27b as being a segment of the arc of a cylinder 53 shown in dotted line form.

FIGURE 6 shows an arrangement embodying the principles of the invention for forming thin laminated plastic sheets not supported on a wood workpiece. The pressure generated by the process and mechanism in the structure above described is a function of the compression step and push back of the material. In the arrangement of FIGURE 6, the shoes 18 and 19 of the structures of FIGURES 1, 3 and 6 may be employed. However, where a wood workpiece is not used, if the manufacturing tolerance for the shoes is plus or minus .005 inch, it will be impossible to mold a plastic sheet .010 inch thick because the pressures generated would vary extremely. This is avoided by using an elastic material shown in the form of a flat elastic pad 56, sufficiently rigid to produce the pressure desired. The pad is carried through between an upper plastic sheet 55 and a lower plastic sheet 56. These sheets are formed from a plurality of layers of separate sheets. In laminated plastics, it is common to utilize a base or backing sheet of a number of layers illustrated at 57 as perhaps utilizing seven separate layers of core stock in the form of a phenolic resin impregnated paper. On the core stock sheets is a melamine impregnated paper pattern sheet 58 which is overlaid by a melamine impregnated paper clear overlay sheet 59. To prevent the lowermost core stock sheet from adhering to the pad 56, a flexible thin steel separator plate 60 is placed on both sides of the resilient pad 56.

As a brief summary of operation, a wood workpiece, FIGURE 4, is fed between opposed shoes 18 and 19 with layers 21, 22 and 23 of a thermosetting plastic impregnated paper laid on the upper finished surface of the workpiece, and a layer 24 of thermosetting plastic impregnated paper on the lower layer. The workpiece and plastic layers are carried between the shoes by the traveling shims or belts 25. The layers are preheated by a surface 26 to bring the plastic to a viscous state, the surface of the wood is compressed by compressing surface 27, and the plastic is cured by the surfaces of the blocks 34. The plastic is then immediately cured by the blocks 36 providing a finished board with a wood core 11, FIGURE 5, with hardened surface layers 12 and 13 on the core, and with cured plastic layers 14 on the bottom surface, and 15, 16 and 17 on the top finished surface.

The method of compressing the surface of the wood beneath the plastic also compensates for original unevenness or roughness in the wood. The wood will compress to different depths with uneven surfaces and the compressed layer will actually be pressed down into the core for different depths leaving a smooth outer surface with only minor deviations remaining. This makes it possible to use rougher wood than could be used with methods heretofore practiced.

For determining the various relationships and factors necessary in order to provide a shim or belt 25 of the proper thickness, and in order to provide a lead-in surface 26 of the proper length, the following computations are given by way of example.

*Pulling force required due to step action*

Figure 10:
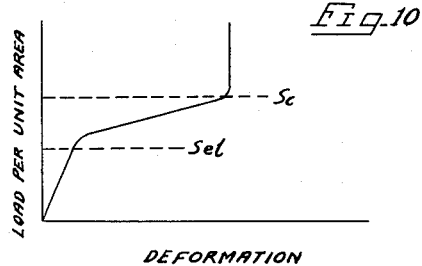

FIGURE 9 is an illustration shown schematically of the compression step performed on the wood, where L and H are the length and height of the compression surface 27, $\theta$ is the angle of the compression surface with the horizontal, P is the pressure normal to the surface, $P_v$ and $P_h$ are the vertical and horizontal components of pressure, $d_1$ is the dimension or depth of totally compressed wood and $d_2$ is the depth of partially compressed wood being fully compressed at the top and decreasing in density linearly to the bottom where wood has a natural density, and the other letters represent points on the diagram. FIGURE 10 shows deformation of the wood plotted against load per unit area.

$$P_h = P \sin \theta$$

$$\sin \theta = \frac{H}{\sqrt{H^2 + L^2}}$$

$$S_c = \frac{P}{XZ} \text{ (per unit width)}$$

therefore $$P = (S_c)(\overline{XZ})$$

$$\overline{XZ} = \sqrt{L^2 + (H+d_1)^2}$$

therefore $$P = S_c \sqrt{L^2 + (H+d_1)^2}$$

and $$P_h = \frac{H}{\sqrt{H^2+L^2}} S_c \sqrt{L^2 + (H+d_1)^2}$$

Where $d_1 = 0$ (no finite layer of completely densified wood)

$$P_h = HS_c$$

*Lead-in required to overcome force due to step action and friction*

Figure 11:
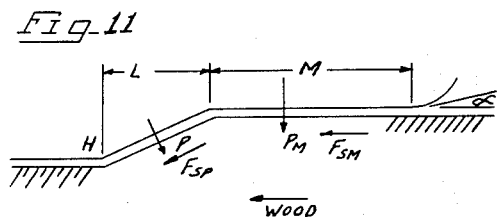

Reference for the following computation is made to FIGURE 11 wherein H and L are again dimensions of the step, M is the length of the lead-in surface, ($\alpha$) is at the angle of the lead-in surface, $P_m$ is the pressure between the workpiece and the lead-in surface, $F_{sp}$ and $F_{sm}$ are the frictional forces for the step surface and the pulling surface respectively. $S_{el}$ and $S_c$ are the elastic limit stress and the crushing stress respectively.

Per unit width $$P_m = MS_{el}$$

$f$ = coefficient of friction—wood to steel therefore $$F_{sm} = P_m f = f M S_{el}$$

Likewise $$F_{sp} = Pf = S_c \sqrt{L^2+(H+d_1)^2} \cdot f$$

Total pulling force in belt $$F_s = F_{sm} \quad F_{sp} \geq F_h$$

At balance—

$$\underbrace{fMS_{el}}_{(P_m f)} + \underbrace{fS_c\sqrt{L^2+(H+d_1)^2}}_{(Pf)} = \underbrace{HS_c \frac{\sqrt{L^2+(H+d_1)^2}}{\sqrt{L^2+H^2}}}_{(P_h)}$$

therefore $$M = \frac{S_c}{S_{el}} \left[ \frac{1}{f} \sin \theta - 1 \right] \sqrt{L^2+(H+d_1)^2}$$

For a self-locking condition by the step, M can be 0. For this to be true $$\frac{1}{f} \sin \theta - 1 \leq 0 \text{ or } \frac{1}{f} \sin \theta \leq 1$$

Using this consideration for the lead-in, $\sin \alpha \leq f$.

*Relationship between slope of step and shim bending when step is formed from axis of tangential cylinders*

Figure 12:
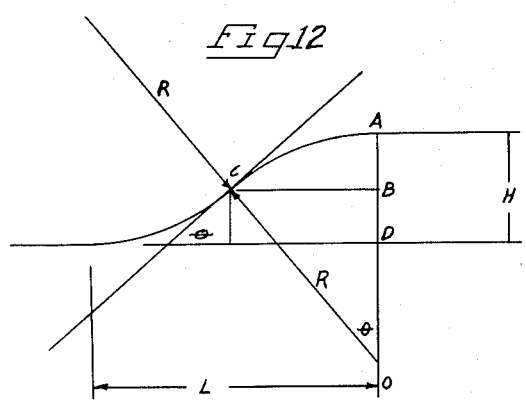

The symbols of the computations below refer to FIGURE 12, and the symbols will be self-explanatory.

$$\overline{OA} = \overline{OC} = R \qquad \overline{AB} = \overline{BD} = \frac{H}{2}$$

$$M = \text{Slope} = \tan \theta = \frac{\overline{BC}}{\overline{OB}}$$

$$\overline{OB} = \overline{OA} - \overline{AB} = R - \frac{H}{2}$$

$$\overline{BC} = \sqrt{\overline{OC}^2 - \overline{OB}^2} = \sqrt{R^2 - \left(R - \frac{H}{2}\right)^2}$$

therefore $$M = \frac{\sqrt{R^2 - \left(R - \frac{H}{2}\right)^2}}{R - \frac{H}{2}}$$

$$M = \sqrt{\frac{RH - \left(\frac{H}{2}\right)^2}{R^2 - RH + \left(\frac{H}{2}\right)^2}}$$

$$\frac{1}{M} = \frac{L}{H} \text{ Approx.}$$

Let $$\frac{L}{H} = N \text{ (Slope)}$$

R is in the range of 1" to 2"
H is no larger than 1/8". Therefore $$\left(\frac{H}{2}\right)^2$$

is quite small compared to R.
Therefore as a close approximation, $$\frac{1}{M} = \frac{L}{H} = N = \sqrt{\frac{R^2 - RH}{RH}}$$

$$N^2 = \frac{R^2 - RH}{RH} = \frac{R - H}{H}$$

$$R - H = HN^2$$
$$R = H(N^2 - 1)$$

*Stress in belt due to bending*

Figure 13:
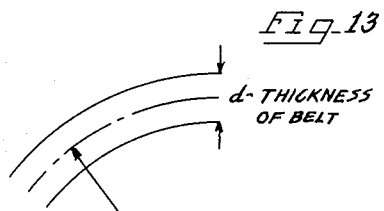

For the following, reference is made to FIGURE 13 and to the symbols used above.

$$R = \frac{E}{S_{\text{bend}}} \times \frac{d}{2} = H(N^2 - 1)$$

E is Young's Modulus of Elasticity
$S_{\text{bend}}$ is fibre stress (basic stress formula)
Solving for $d$, $$d = \frac{2H S_{\text{bend}}(N^2 - 1)}{E}$$

Also, $$d \geq \frac{F}{S_{\text{tens.}}} \text{ for unit width}$$

Where $F$ is total pull in tension and $S_{\text{tens.}}$ allowable stress in tension (per unit width)
for stress in tension equal to stress in bending, $$d^2 = \frac{F \cdot 2H S_{\text{bend}}(N^2 - 1)}{S_{\text{tens.}} E}$$

$$d = \sqrt{\frac{2FH(N^2 - 1)}{E}}$$

*Tension force in belt*

Figure 14:
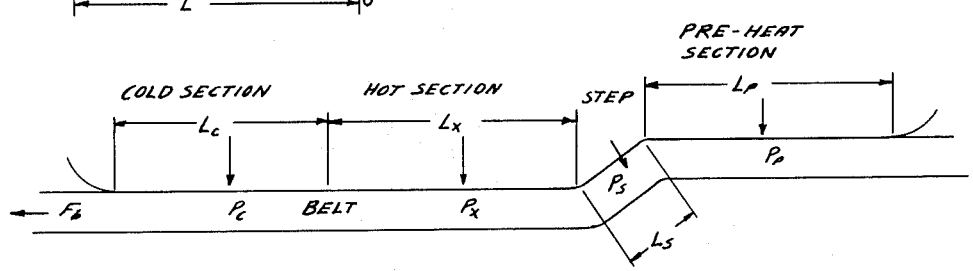

For the following analysis, reference is made to FIGURE 14 where the factors P indicate pressure and L indicate length. $F_b$ is the force on the belt. $P_h$ was deduced above.

$f$ = coefficient of friction-belt to platen.

$$F_b = P_c f_c + P_x f_x + P_s f_s + P_p f + P_h$$

$$P_c = L_c S_{el}, \quad P_x = L_x S_{el}, \quad P_p = L_p S_{el}$$

$$P_s = S_c \sqrt{L^2 + (H + d_1)^2}$$

$$P_s = S_c \sqrt{L^2 + H^2} = S_c L_s \text{ (where } d_1 = 0\text{)}$$

$$P_h = \frac{H S_c \sqrt{L^2 + (H + d_1)^2}}{\sqrt{L^2 + H^2}}$$

$$P_h = H S_c \text{ (where } d_1 = 0\text{)}$$

For most applications the temperatures in the pre-heat, step, and hot sections are very close to the same and therefore the coefficients of friction are equal in these areas.

$$F_b = S_{el}\left[f_c L_c + f_x\left(L_x + L_s \frac{S_c}{S_{el}} + L_p\right)\right] + H S_c (d_1 = 0)$$

Because $L_s$ is about ⅜" and the total length is 12", this term can be approximated as $$F_b = S_{el}[f_c L_c + f_x(L_x + L_p)] + H S_c$$

The following is an example of a mechanism wherein the shim thickness is provided for a specific shoe design.
Requirements:

| | |
|---|---|
| Platen length _____ in__ | 12 |
| H (step height) _____ in__ | .090 |
| N (slope of step) _____ | 3½ to 1 |
| $f_x$ _____ | .014 |
| $f_c$ _____ | .003 |
| $d_1$ _____ | 0 |
| $S_{el}$ _____ | 4800 |
| $S_c$ _____ | 7800 |
| $L_p$ _____ in__ | 1 |
| $L_x$ _____ in__ | 6 |
| $L_c$ _____ in__ | 5 | from $$F_b = S_{el}[f_c L_c + f_x(L_x + L_p)] + H S_c$$
$$F_b = 4800[(.003)(5) + (.014)(6 + 1)] + (.090)(7800)$$
$$= 1,242 \text{ lbs. per in. of width}$$

Step design:

$$R = H(N^2 - 1)$$
$$= .090(12.25 - 1)$$
$$= 1.01 \text{ in.—use } 1.0 \text{ in.}$$

Bending stress = total tension stress $$d = \sqrt{\frac{2FH(N^2 - 1)}{E}}$$

$$= \sqrt{\frac{2(.090)(1242)(11.25)}{30 \times 10}}$$

$$= .00915, \text{ use } .010 \text{ in.}$$

Check on length of pre-heat section for adequate friction to pull in work $$M \geq \frac{S}{S_{el}}\left[\frac{1}{f} \sin \theta - 1\right]\sqrt{L^2 + (H + d_1)^2}$$

$f$ for wood = .08
3½/1 = 16°
Sin 16° = .276

$$M = \frac{7800}{4800}\left[\frac{1}{.08}(.276) - 1\right]\sqrt{(.315^2 + (.090)}$$

$$= 1.25 \text{ in.}$$

Stope at lead to pre-heat

Sin $\theta \leq f$
Sin $\theta = .08$
$\theta = 4½°$

It will be understood that modifications and variations may be effected without departing from the spirit and scope of the novel concepts of the present invention.

We claim:

1. In a machine for forming workpieces in sheet form, first and second shoes having opposed surfaces in spaced apart relation, at least one of said opposed surfaces including in longitudinal arrangement a first flat surface, a second flat surface parallel to said first flat surface and a compression surface inclined inwardly from said first to said second flat surface, first and second sheets of thin flexible metal having a high tensile strength positioned to move over the surfaces respectively of said first and second shoes, and means for pulling said sheets across the surfaces of said shoes with a workpiece sandwiched in between said sheets.

2. Apparatus for forming workpieces in sheet form comprising a frame, first and second shoes mounted on said frame in parallel spaced relationship to define therebetween a passageway having inlet and outlet ends, each of said shoes having a first flat surface adjacent to said inlet end, a second flat surface adjacent to said outlet end and a compression surface sloping inwardly from said first to said second flat surface, first and second sheets of thin flexible metal having a high tensile strength positioned to move over the surfaces respectively of said first and second shoes, and means for pulling said sheets across the surfaces of said shoes with a workpiece sandwiched in between said sheets.

3. In a machine for forming flat workpieces, first and second shoes having opposed surfaces in spaced apart relation to define therebetween a passageway having inlet and outlet ends, at least one of said shoes having a first flat surface adjacent to said inlet end, a second flat surface adjacent to said outlet end and a compression surface sloping inwardly from said first to said second surface, said compression surface having a slope conformed to two tangent arcs of circles, first and second sheets of thin flexible metal having a high tensile strength positioned to move over the surfaces respectively of said first and second shoes, and means for pulling said sheets across the surfaces of said shoes with a workpiece sandwiched in between said sheets.

4. Apparatus for forming workpieces in sheet form comprising a frame, first and second shoes mounted on said frame in parallel spaced relationship to define therebetween a passageway having inlet and outlet ends, each of said shoes having a first flat surface adjacent to said inlet end, a second flat surface adjacent to said outlet end and a compression surface inclined inwardly from said first to said second surface, means for selectively changing the mounted position of one of said shoes for changing the spacing between said shoes, first and second sheets of thin flexible metal having a high tensile strength positioned to move over the surfaces respectively of said first and second shoes, and means for pulling said sheets across the surfaces of said shoes with a workpiece sandwiched in between said sheets.

5. In a machine for forming flat workpieces, a frame, first and second shoes mounted on said frame in parallel space apart relation to define a passageway therebetween having inlet and outlet ends, said shoes facing each other and each having a first flat surface adjacent to said inlet end, a parallel second flat surface adjacent to said outlet end and a compression surface sloping inwardly from said first to said second surface, means for maintaining said surfaces at predetermined operating temperatures, first and second sheets of thin flexible material having a high tensile strength positioned to move over the surfaces respectively of said first and second shoes, and means for pulling said sheets across the surfaces of said platens with a workpiece sandwiched in between said sheets.

6. In a machine for forming workpieces in sheet form, a frame, first and second shoes mounted on said frame in parallel spaced apart relation to define therebetween a passageway having inlet and outlet ends, said shoes facing each other and each having a first flat surface adjacent to said inlet end, a parallel second flat surface adjacent to said outlet end and a compression surface sloping inwardly from said first to said second surface, first and second endless loops of thin flexible material having a high tensile strength positioned to move over the respective surfaces of said first and second shoes, and means for driving each of said loops so that a workpiece can be drawn between said shoes by frictional engagement with the surface of the material.

7. A machine for finishing a surface of a workpiece by applying heat and pressure to the workpiece comprising a frame, first and second means on said frame in parallel spaced apart relation to define a passageway therebetween having inlet and outlet ends, said first means including a continuous surface having a first flat surface adjacent to said inlet end, a parallel second flat surface adjacent to said outlet end and a compression surface sloping inwardly from said first to said second surface, heating means for applying heat to said first flat surface, other heating means for applying heat to said second flat surface adjacent to said compression surface, cooling means for cooling said second flat surface adjacent to said outlet end, said second means including a continuous surface facing the continuous surface of said first means, first and second sheets of thin flexible material having a high tensile strength positioned to move over the continuous surfaces of said first and said second means, and means for pulling said sheets across the continuous surfaces with a workpiece sandwiched in between said sheets.

8. A machine as claimed in claim 17 wherein the continuous surface of said second means includes flat and compression surfaces oppositely disposed with respect to the corresponding surfaces of said first means, and corresponding heating and cooling means are provided for the flat and compression surfaces of said second means.

9. In a machine for forming flat workpieces, a frame, first and second shoes mounted on said frame in parallel spaced apart relation to define a passageway therebetween having inlet and outlet ends, said shoes facing each other and each having a first flat surface adjacent to said inlet end, a parallel second flat surface adjacent to said outlet end and a compression surface sloping inwardly from said first to said second surface, said compression surface having a slope formed of two tangent arcs of circles, means for maintaining said surfaces at predetermined operating temperatures, first and second sheets of thin flexible material having a high tensile strength positioned to move over the surfaces respectively of said first and second shoes, and means for pulling said sheets across the surfaces of said platens with a workpiece sandwiched in between said sheets.

10. A machine for forming workpieces with opposite flat surfaces having desired physical properties comprising a frame, first and second shoes mounted on said frame in spaced relationship to define therebetween a passageway having inlet and outlet ends, each of said shoes having a first flat surface adjacent to said inlet end, a second flat surface parallel to said first flat surface adjacent to said outlet end and a compression surface sloping inwardly from said first to said second surface, heating means for applying heat to said first flat surface, heating means for applying heat to said second flat surface near to said compression surface, cooling means for cooling said second flat surface adjacent to said outlet end, first and second sheets of thin flexible metal having a high tensile strength positioned to move over the surfaces respectively of said first and second shoes, and means for pulling said sheets across the surfaces of said shoes with a workpiece sandwiched in between said sheets.

11. A machine for forming workpieces with opposite flat surfaces having desired physical properties comprising a frame, first and second shoes mounted on said frame in spaced relationship to define therebetween a passageway having inlet and outlet ends, each of said shoes having a first flat surface adjacent to said inlet end, a second flat surface parallel to said first flat surface adjacent to said outlet end and a compression surface sloping inwardly from said first to said second surface, heating means for applying heat to said first flat surface, heating means for applying heat to said second flat surface near to said compression surface, cooling means for cooling said second flat surface adjacent to said outlet end, first and second sets of rollers mounted on said frame in operative association respectively with said first and second shoes, first and second endless loops of thin flexible metal having a high tensile strength positioned to move over the respective surfaces of said first and second shoes and fitting over the sets of rollers operatively associated with said first and second shoes, at least one of the rollers of each set being shiftable to tension said loops, and drive means associated with said sets of rollers for driving each of said loops so that a workpiece can be drawn between said shoes by frictional engagement with the surface of said metal.

12. Apparatus for forming workpieces in sheet form comprising a frame, first and second shoes mounted on said frame in spaced apart relation to define therebetween a passageway having inlet and outlet ends, each of said shoes having a first flat surface adjacent to said inlet end, a second flat surface adjacent to said outlet end and a compression surface sloping inwardly from said first to said second surface, means for maintaining said surfaces at predetermined temperatures, first and second sheets of thin flexible material having a high tensile strength positioned to move over the surfaces respectively of said first and second shoes, a resilient pad between said sheets, and means for pulling said sheets past said shoes with workpieces sandwiched in between said pad and each of said sheets.

References Cited by the Examiner

UNITED STATES PATENTS

| | | | |
|---|---|---|---|
| 1,086,097 | 2/14 | Swift | 100—93 |
| 2,046,047 | 6/36 | Watkins | 100—151 |
| 2,071,999 | 2/37 | Dike | 100—93 |
| 2,279,112 | 4/42 | Drake | 100—93 |
| 2,459,295 | 1/49 | Skoog | 100—93 |
| 2,479,290 | 8/49 | Auxier et al. | 100—151 |
| 2,542,901 | 2/51 | Chaffee | 100—151 |
| 2,923,439 | 2/60 | Benton | 100—151 |

WALTER A. SCHEEL, *Primary Examiner.*

DOUGLAS J. DRUMMOND, *Examiner.*

UNITED STATES PATENT OFFICE
CERTIFICATE OF CORRECTION

Patent No. 3,207,062                 September 21, 1965

Carroll H. Van Hartesveldt et al.

It is hereby certified that error appears in the above numbered patent requiring correction and that the said Letters Patent should read as corrected below.

Column 10, lines 30 to 32, in the equation, for that portion reading "(.315$^2$" read -- (.315)$^2$ --; column 11, line 72, for the claim reference numeral "17" read -- 7 --.

Signed and sealed this 24th day of May 1966.

(SEAL)
Attest:

ERNEST W. SWIDER
Attesting Officer

EDWARD J. BRENNER
Commissioner of Patents